Oct. 26, 1943.   J. A. NAHLINGER   2,332,661
TAPPET
Filed Jan. 15, 1942

INVENTOR.
JOHN A. NAHLINGER
BY
ATTORNEYS.

Patented Oct. 26, 1943

2,332,661

UNITED STATES PATENT OFFICE 2,332,661

TAPPET

John A. Nahlinger, Cleveland, Ohio

Application January 15, 1942, Serial No. 426,877

6 Claims. (Cl. 123—90)

This invention relates, as indicated, to valve tappet adjusting means, but has reference more particularly to means for retaining the tappet screw in adjusted position.

Originally the tappet screw was locked in adjusted position relatively to the stem of the tappet to which such screw was threaded, by means of an ordinary bolt the end faces of which were radial and the axial faces of which were adapted to be engaged by a wrench. One of the radial faces of the nut was jammed against the stem and locked the latter to the screw. Such locking means are subject to the following objections:

1. Each adjustment of the screw requires loosening and tightening of the nut;
2. It is difficult to hold the screw in the exact position desired while jamming the nut;
3. The nut and the head of the screw are so close together and inconveniently located in a motor that they are apt to be confused, and
4. Two wrenches, one for the nut and one for the screw head, and consequently two hands are simultaneously required to accomplish the difficultly attained precise adjustment.

The market then demanded that these objections be overcome and the result was a spring which dragged between the screw and the stem. The structure required to utilize such a spring is complicated, bulky and costly to manufacture.

My step forward in the tappet art is the elimination of such complications, bulkiness, and costliness. I do not use a spring and yet a tappet having incorporated therein my adjusting means requires manipulation of only the screw and has retained adjustment under severe actual test.

A primary object of the invention is to provide means for adjusting the tappet length so as to vary the clearance between the tappet and valve stem in combination with means for effectively maintaining the tappet in adjusted position.

Another object of the invention is to provide valve tappet adjusting means which can be manipulated with one hand, leaving the other hand free for the use of a tappet clearance gauge or the like.

A further object of the invention is to provide means for concealing the tappet adjustment retaining means so as to prevent unauthorized, accidental, or unskilled adjustment of said retaining means.

Other objects and advantages of the invention will be apparent during the course of the following description.

In the accompanying drawing, forming a part of this specification, and in which like numerals are employed to designate like parts throughout the same:

Figure 1:
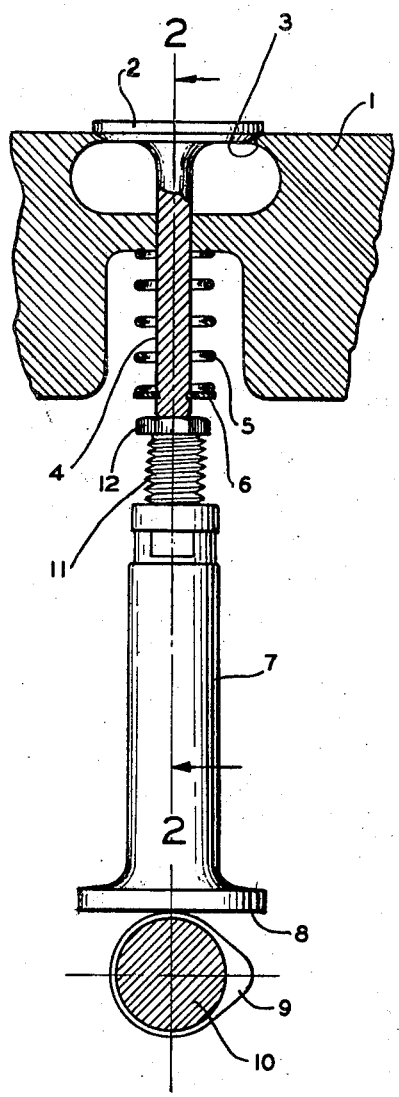
Fig. 1 is a view, partly in section and partly in elevation, showing a tappet embodying the invention.
Figure 2:
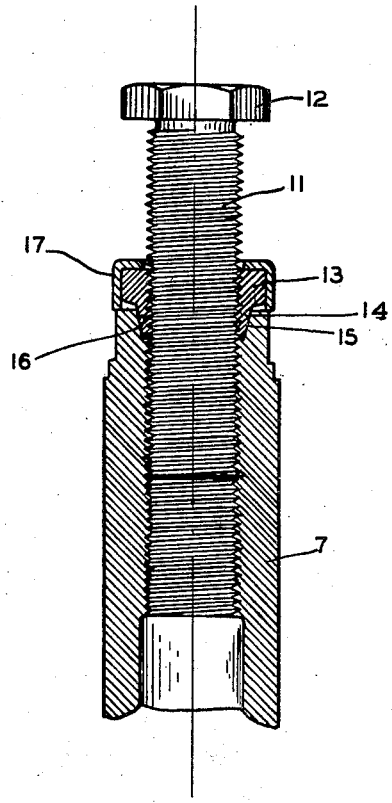
Fig. 2 is a fragmentary cross-section taken on the line 2—2 of Fig. 1.
Figure 3:
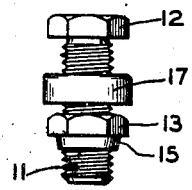
Fig. 3 is a detail elevation of the tappet screw, lock-nut and cover.

In the drawing, reference numeral 1 designates the cylinder block of an internal combustion engine provided with the usual poppet valve 2 engageable with a valve seat 3 and having its stem 4 slidably mounted in the block and urged to valve closing position by the usual surrounding valve spring 5 bearing on a valve washer 6 which is secured to the valve stem.

A tappet member or sleeve 7 is slidably mounted in the cylinder block below and in axial alignment with the valve stem and has the usual enlarged lower end 8 periodically lifted by a cam 9 on a cam shaft 10 to thereby actuate the valve.

The stem of the tappet member 7 has a threaded recess, the threads of which are engaged by a tappet screw 11 which is provided with a head 12. This head has flat sides whereby the screw may be engaged by a wrench to thereby move the screw axially with respect to the member 7 so as to adjust or vary the clearance between the head 12 and the lower end of the stem 4 in accordance with well-recognized practice.

My means for retaining the tappet screw in adjusted position comprises a nut 13 having flat sides similar to those on the head 12 so as to be engageable by the same wrench as that used for turning the screw 11. The nut 13 is in threaded engagement with the screw 11 and has a stem portion 14 presenting a conical outer surface 15 which is adapted to engage a similar surface 16 forming the outer wall of a counterbore in the upper end of the recess of the tappet sleeve 7.

Although the surfaces 15 and 16 are both shown as conical, it will be understood that only one need be conical. The thickness of the lower part of the wall of the stem portion 14 is relatively slight whereby when the nut is screwed downwardly, the action of the surfaces 15 and 16 wedges or squeezes such lower part into intimate engagement with the screw 11 and thus acts as a brake. For best results the surfaces 15 and 16 and the shoulder at the upper end of the nut are so related that when such shoulder rests against the top of the tappet stem, the wedging or squeezing action does not constitute a dead brake and freeze the screw to the tappet stem because such braking and freezing would be open to the objections above enumerated. When such shoulder rests against the top of the tappet sleeve, then the screw should be adjustable with the aid of a wrench, but capable of resisting motor vibrations. The latter result can be attained even though the surface 15 is increased in length and the function of the taper is to cause the portion 14 to engage the screw with sufficient snugness to permit adjustment of the screw only by means of a wrench and to prevent motor vibrations as well as such adjustments from loosening the nut.

In order to insure against accidentally disturbing the nut after it has been once set, I cover it with a snugly fitting cap 17. The fit is such that a screwdriver or the like can easily pry the cap off, but motor vibrations will be ineffective. The cap also conceals the nut from unskilled workmen, who, after discovering the nut, will then be warned against disturbing the same.

After the original positioning of the nut, it need not be moved. Thus, when it is desired to adjust the clearance between the head 12 of the screw 11 and the lower end of the valve stem, the nut remains concealed and protected by the cap while the screw is turned in either direction for adjusting purposes. I wish to stress that the clearance may be increased or decreased with equal facility while the nut remains undisturbed and that the effectiveness of the nut is constant notwithstanding manual manipulation of the screw.

It will be obvious to those skilled in the art that my tappet is economical to manufacture, structurally simple, and very compact.

It thus appears that a highly effective tappet adjustment has been provided, which adjustment can be effected by means of a single wrench, leaving one hand free for the use of a tappet clearance gauge.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In combination, a poppet valve, a tappet unit comprising a tappet sleeve and a tappet screw axially adjustable relatively to said sleeve, and means for exerting a clamping action on said screw to lock it in adjusted position, said means comprising a nut threadedly secured to said screw, said nut having a tapered stem engageable with said sleeve.

2. In combination, a poppet valve, a tappet unit comprising a tappet sleeve having a counterbore in its upper end and a tappet screw axially adjustable relatively to said sleeve, and means for exerting a clamping action on said screw sufficient to lock it but insufficient to prevent adjustment of it with the aid of a wrench, said means comprising a nut threadedly secured to said screw, said nut having a tapered stem engageable with the wall of said counterbore.

3. In combination, a poppet valve, a tappet unit comprising an interiorly threaded tappet sleeve having a counterbore in its upper end, and a tappet screw axially adjustable relatively to said sleeve, and means for exerting a clamping action on said screw to lock it in adjusted position, said means comprising a nut in threaded engagement with said screw and having a stem, the surface of which is in engagement with the surface of said counterbore, one of said surfaces being conical, whereby, upon relative movement of said nut towards said sleeve, said stem grips said screw sufficiently to prevent disturbance of the screw due to motor vibrations, but not sufficiently to prevent adjustment of the screw by means of a wrench.

4. In combination, a poppet valve, a tappet unit comprising a tappet sleeve and a tappet screw, a nut for locking said screw in adjusted position, and means for normally concealing said nut entirely from view, said means being movable relatively to said sleeve.

5. In combination, a poppet valve, a tappet unit comprising a tappet sleeve and a tappet screw, a nut for locking said screw in adjusted position, and a cap loosely mounted on said nut and having a skirt portion adapted to entirely conceal the nut from view, said cap being movable to uncover said nut.

6. In combination, a poppet valve, a tappet unit comprising an interiorly threaded tappet sleeve having a counterbore in its upper end, and a tappet screw axially adjustable relatively to said sleeve, and means for exerting a clamping action on said screw to lock it in adjusted position, said means comprising a nut in threaded engagement with said screw and having a head or body portion and a stem portion forming a shoulder with said head or body portion, the surface of said stem being in engagement with the surface of said counterbore, one of said surfaces being conical, whereby, upon relative movement of said nut towards said sleeve and said shoulder into engagement with the top of said sleeve, said stem grips said screw sufficiently to prevent disturbance of the screw due to motor vibrations, but not sufficiently to prevent adjustment of the screw by means of a wrench.

JOHN A. NAHLINGER.